United States Patent
Mathew (10) Patent No.: US 10,268,810 B2
(45) Date of Patent: *Apr. 23, 2019

(54) METHODS, APPARATUS AND SYSTEMS FOR SECURELY AUTHENTICATING A PERSON DEPENDING ON CONTEXT

(71) Applicant: Mastercard International Incorporated, Purchase, NY (US)

(72) Inventor: Bejoy Mathew, Dardenne Prairie, MO (US)

(73) Assignee: Mastercard International Incorporated, Purchase, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/968,267

(22) Filed: May 1, 2018

(65) Prior Publication Data

US 2018/0247033 A1   Aug. 30, 2018

Related U.S. Application Data

(63) Continuation of application No. 14/514,847, filed on Oct. 15, 2014, now Pat. No. 9,977,881.

(51) Int. Cl.
  *G06F 21/31* (2013.01)
  *G06F 21/32* (2013.01)
  (Continued)

(52) U.S. Cl.
  CPC ............ *G06F 21/31* (2013.01); *G06F 21/32* (2013.01); *G06Q 20/363* (2013.01);
  (Continued)

(58) Field of Classification Search
  CPC ......... G06F 21/31; G06F 21/32; G06Q 50/01; G06Q 20/40145; G06Q 20/363; H04L 63/0861; H04L 63/0884
  See application file for complete search history.

(56) References Cited

U.S. PATENT DOCUMENTS 9,536,256 B2 * 1/2017 Toomer .................. G06Q 10/10
9,727,923 B2 * 8/2017 Teh ..................... G06Q 10/1091
(Continued)

FOREIGN PATENT DOCUMENTS

EP    2180633 A1    4/2010

OTHER PUBLICATIONS

"Australian Examination Report No. 1 for standard patent application", Apr. 24, 2018, Australian Government IP Australia, Australian Application No. 2015333635, 3pgs.
(Continued)

*Primary Examiner* — Jason K Gee
*Assistant Examiner* — Shu Chun Gao
(74) *Attorney, Agent, or Firm* — Buckley, Maschoff & Talwalkar LLC (57) ABSTRACT

Systems, methods and apparatus are described for securely authenticating a user at an appropriate level of security depending on context. A system embodiment includes a meta-wallet system platform, a user mobile device, and a plurality of entity computers. A meta-wallet processor receives a user authentication request from a user mobile device including a meta-wallet identifier, an entity identifier, a context identifier, and at least one of user biometric data, user personal assets data, and user social media data. The meta-wall processor then determines that the user is a registered meta-wallet user, defined at least one security protocol, and is engaging in a predetermined type of activity. A security protocol is then selected, and a determination made that a combination of personally identifiable assets data and user biometric data and/or user social media data matches stored data and satisfies the security protocol. The meta-wallet processor then transmits a user authentication confirmation message to the user mobile device and/or to an entity computer.

23 Claims, 7 Drawing Sheets

(51) Int. Cl.
*G06Q 20/36* (2012.01)
*G06Q 20/40* (2012.01)
*G06Q 50/00* (2012.01)
*H04L 29/06* (2006.01)

(52) U.S. Cl.
CPC ....... *G06Q 20/40145* (2013.01); *G06Q 50/01* (2013.01); *H04L 63/0861* (2013.01); *H04L 63/0884* (2013.01)

(56) References Cited

U.S. PATENT DOCUMENTS

| | | | | |
|---|---|---|---|---|
| 9,858,564 | B2* | 1/2018 | Ready | G06Q 30/0633 |
| 2006/0136332 | A1* | 6/2006 | Ziegler | G06F 21/31 |
| | | | | 705/39 |
| 2009/0177587 | A1* | 7/2009 | Siegal | G06F 21/32 |
| | | | | 705/67 |
| 2012/0123944 | A1* | 5/2012 | Patterson | G06Q 20/206 |
| | | | | 705/44 |
| 2013/0127591 | A1 | 5/2013 | Shay et al. | |
| 2013/0290700 | A1* | 10/2013 | Davis | H04L 63/0428 |
| | | | | 713/153 |
| 2014/0123231 | A1 | 5/2014 | Low et al. | |
| 2015/0026049 | A1* | 1/2015 | Theurer | G06Q 20/36 |
| | | | | 705/41 |
| 2015/0061826 | A1* | 3/2015 | Webber | G06K 7/10297 |
| | | | | 340/5.53 |
| 2016/0210605 | A1* | 7/2016 | Vaish | G06Q 20/12 |
| 2017/0272316 | A1* | 9/2017 | Johnson | H04L 61/301 |
| 2018/0158036 | A1* | 6/2018 | Zhou | G09C 5/00 |

OTHER PUBLICATIONS

"Communication: The Extended Supplementary European Search Report", Jun. 5, 2018 (Jun. 5, 2018), European Patent Office, for European Australian Application No. 15851135.2-1213 / 3207515, 10pgs.

* cited by examiner

METHODS, APPARATUS AND SYSTEMS FOR SECURELY AUTHENTICATING A PERSON DEPENDING ON CONTEXT

CROSS REFERENCE TO RELATED APPLICATION

This application is a continuation of U.S. patent application Ser. No. 14/514,847, filed on Oct. 15, 2014, which is incorporated herein by reference for all purposes.

FIELD OF THE INVENTION

Embodiments disclosed herein generally relate to methods, apparatus and systems for securely authenticating a person at an appropriate level of security depending on the context. In some embodiments, a flexible, multiple-factor, secure and customizable authentication process enables a person to, for example, purchase goods and/or services online, gain entry to secure buildings, and/or gain access to transportation services without having to enter any passwords.

BACKGROUND

Payment cards such as credit cards, debit cards and/or pre-paid cards are ubiquitous, and for decades such cards have included a magnetic stripe on which the relevant account number and other data is stored. Traditionally, to consummate a purchase transaction with such a payment card, the card is swiped through a magnetic stripe reader in a retail store that is part of the point-of-sale (POS) terminal. The reader reads the account number from the magnetic stripe, and that account number is then used to route a transaction authorization request initiated by the POS terminal. In many cases, in order to authenticate the consumer, a prompt appears on a data entry device for the consumer to provide his or her signature and/or a personal identification number (PIN).

Payment card-based transactions are now typically performed across multiple channels of commerce. For example, payment card-based transactions may be performed in-person at a retail outlet, via a computer connected to the internet (an online transaction), via a mobile phone and/or via a company-based call center (e.g., a 1-800 number for a catalog company). These various types of transactions are conducted in different ways, and thus each type of transaction is associated with a different level of fraud risk. In addition, the payment card transactions generally require that the consumer have his or her payment card available to either present to a cashier in a retail environment, or to enter the requested information via a web browser for an internet transaction, and/or to provide requested information over the telephone. In addition, many authentication processes require the consumer to remember and then provide a personal identification number (PIN) or some other type of number and/or password known only to that consumer. Those knowledgeable in the field recognize that the risk of financial fraud is greater for a remote transaction because there is less ability for the merchant to verify the identity and authenticity of the cardholder. The nature of remote transactions therefore increases risk for the merchant and for the payment card network provider (and/or the payment card issuer financial institution), which often results in more cardholder disputes and associated chargebacks than occur after in-person transactions.

With the advent of e-commerce (electronic commerce) and m-commerce (mobile commerce), consumers are using portable devices, such as smart phones, tablet computers, digital music players, and/or personal digital assistants (PDAs), to make purchases in retail stores and via merchant websites over the internet. Consequently, various techniques have evolved that allow consumers to pay for goods and/or services by utilizing a mobile device that is associated with one or more payment card accounts.

The terms mobile money, mobile money transfers, and mobile wallet generally refer to mobile device payment services that are performed via a mobile device. Thus, instead of paying by cash, check, credit card, debit card or store card, a consumer uses, for example, his or her mobile telephone to pay for a wide range of services and/or digital goods and/or hard goods. Although the concept of using non-coin-based currency systems has a long history, it is only fairly recently that the technology to support such mobile device payment systems has become widely available.

In some mobile device payment schemes, short message service (SMS) text messages are transmitted by consumers to their issuer financial institutions to send payment requests regarding purchases from merchants, and when the purchase is consummated a premium charge is applied to their phone bill or to their online wallet. The merchant involved in such a payment transaction is informed of the payment success and then releases the paid-for goods. In such cases, a trusted physical delivery address may not have been utilized, and thus the goods that can be purchased in such manner are most frequently digital items with the merchant replying using a multimedia messaging service (MMS) to deliver, for example, items such as digital music, ringtones, and/or digital wallpaper.

Some online companies, such as PayPal, Amazon Payments, and Google Wallet, also have mobile device payment options. In general, such mobile device payment schemes require consumers to first register with the mobile payment provider by providing information such as their name, residence address, and mobile phone number. After registration, the mobile payment provider transmits an SMS message to the consumer's device that includes a personal identification number (PIN). The consumer then enters the received PIN into an application running on his or her mobile device, which transmits it to the mobile payment provider to authenticate that mobile telephone number. When making a purchase utilizing his or her mobile device, the consumer then provides credit card information and/or another payment method (if necessary) and validates the payment. Subsequent mobile device payment transactions require the consumer to re-enter his or her PIN to authenticate and to validate payment. Such systems can be directly integrated with, or can be combined with, operator and credit card payments through a unified mobile web payment platform.

Payment solutions that utilize PINS and/or passwords to authenticate the mobile device owner offer some level of authentication, but they are weaker or at best equivalent to other payment systems available for point-of-sale (POS) transactions. Thus, the industry may be hesitant to move towards higher value mobile device payment transactions. For example, if a criminal steals a mobile device and is able to decipher the PIN, the criminal can use the mobile device as if he or she is the legitimate owner. Mobile payment solutions that store a consumer's financial account information on his or her mobile device are at even greater risk. For example, if a consumer's financial account information is stored on an IC card of the mobile device, and the criminal defeats the IC card's security features (if any), then the criminal then has instant access to the consumer's (the mobile device owner's) financial account.

Accordingly, some mobile devices are equipped with biometric readers, such as fingerprint sensors or iris readers, which function to restrict access via biometric security measures. However, such devices are not commonly available or affordable to consumers. In addition, mobile payment solutions that require specially equipped mobile devices to communicate with a POS terminal (or with a website) can hinder adoption due to the need for consumers to purchase such specially equipped devices, and due to the need for merchants to purchase hardware infrastructure to support such devices.

Furthermore, many mobile payment solutions do not account for the limitations of mobile devices. For example, some cell phone interfaces offer limited keypad functionality, which can make sending text messages inconvenient, especially during a transaction at a POS terminal. Similarly, DTMF methods typically require the consumer to switch back and forth between listening to the phone and pressing the keypad. Interactive voice request (IVR) solutions, in which a PIN is spoken into the cell phone, risk compromise of secret information by eavesdroppers. Such issues lessen the appeal of mobile device payment solutions and thereby limit their adoption.

Biometric authentication systems have been proposed that purportedly offer merchants a convenient and secure means for POS transactions. For example, "pay by touch" biometric payment solutions have been promoted that allow a consumer to register multiple payment accounts, as well as loyalty account information and other personal and identity-related information, in a central location. Such systems permit a consumer to access this information by providing a fingerprint scan at a POS terminal. However, to implement such a system, a merchant's POS terminals must be equipped with biometric sensors and/or scanners and/or biometric readers and the associated operating systems. Regardless of the benefits (e.g., security, convenience, etc.), a merchant may be hesitant to implement such a biometric payment solution due to the cost, time and other resources required for installation.

The inventor recognized that there is a need for simple, secure and flexible systems and methods for authenticating a person at an appropriate level of security depending on the context. For example, a need exists for simple, secure systems and methods for authenticating a consumer in association with a mobile device transaction which does not require the consumer to have to remember a PIN and/or password, or for authenticating a user wishing to gain entry to a secure building. Such systems and methods should enable users such as consumers and/or employees and/or commuters, for example, to customize the level of security in accordance with their comfort levels and based on the context of the transaction or activity.

BRIEF DESCRIPTION OF THE DRAWINGS

Features and advantages of some embodiments of the present invention, and the manner in which the same are accomplished, will become more readily apparent upon consideration of the following detailed description of the disclosure taken in conjunction with the accompanying drawings, which illustrate exemplary embodiments and which are not necessarily drawn to scale, wherein.

DETAILED DESCRIPTION

In general, and for the purpose of introducing concepts of embodiments, described are authentication methods, apparatus and/or systems which can be utilized by a user with his or her mobile device for various activities and/or transactions. In particular, the authentication process utilizes various types of personal data, such as a user's biometric data, personal asset data and/or social media data to conveniently authenticate the user at a level of security that is appropriate to the situation or context. In some embodiments, a person enrolls or registers with a meta-wallet service and is assigned a unique meta-wallet identifier which is utilized as a mapping point and/or connection point with various databases, such as a biometric database, a social media database, a personal assets database, and/or other databases including external data sources or databases. Thus, a user who owns a payment enabled mobile device or digital device (such as a smartphone, a mobile telephone, a tablet computer, a laptop computer, a personal digital assistant (PDA) and the like) registers for the meta-wallet authentication service by using a mobile device (or a personal computer) to visit, in some implementations, a meta-wallet technology platform hosted by a meta-wallet server infrastructure.

In some embodiments, during the meta-wallet enrollment process a person or user provides information to a meta-wallet computer of a meta-wallet system platform that concerns the consumer's device (for example, the brand and model of the consumer's mobile telephone and what its' capabilities) and also that identifies the financial and/or payment accounts (such as credit card accounts, debit card accounts, loyalty card accounts and/or gift card accounts) that have been loaded into his or her digital wallet. The person may also provide user identifiable data, which can include biometric data (such as a fingerprint data and/or iris scan data and/or voice data and/or other types of audible data or physical activity data) and/or personal data (such as a license plate number of the user's automobile and/or a mobile telephone identifier) and/or social media data (such as a twitter handle and/or a social media webpage nickname and/or one or more e-mail addresses) which are saved in one or more databases. In some embodiments, the user is also prompted to select one or more combinations of the various types of user identifiable data for authentication purposes as applied to one or more different types of transactions and/or transaction contexts. For example, in the context of a purchase transaction, for purposes of checking-out online and/or at a point-of-sale (POS) device at a retail store, the user may specify that at least one biometric feature (such as a fingerprint) and at least one personal asset data (such as a license plate number) must be input or provided by the user in order for that user to be authenticated. In the context of purchase transactions, some or all of the user authentication requirements may be dictated by an entity such as the financial institution that issued the user's credit card account. In another example, in the context of user entry to a secure building (such as a company manufacturing facility), during meta-wallet enrollment a person may be required to provide iris scan data to the meta-wallet system platform, which may be a requirement of the employer (who may also be enrolled or registered to utilize the meta-wallet system). The user may also be required to provide an e-mail address and/or provide an identifiable picture (such as a head and shoulders photograph) which may also be saved in a memory of his or her mobile device. In the case of more secure facilities, such as government military facilities, the person may be required to provide additional information in other formats in addition to utilizing his or her mobile device to provide authentication data (for example, a government-issued identification card, such as a state driver's license, may be required in addition to other biometric and/or personal asset data). In some implementations, the level of security that is appropriate for a particular situation (such as access to a building or authentication for a purchase transaction) may be defined by the user, or may jointly depend upon a user's discretion plus business rules or security rules provided by one or more entities (such as issuer financial institutions (FIs) that issue one or more payment card accounts to the user, or by a person's employer with regard to providing access to company buildings and the like), or may be defined by a third party entity according to predetermined rules.

In some implementations, after the user registers for the meta-wallet service, a meta-wallet application program is downloaded by the user and stored in a secure location on the user's device (such as in a secure memory location of a Smartphone). The meta-wallet application program is operable to analyze transaction information to determine a type of transaction that is occurring, and then, based on that data and data supplied by the user during registration, to prompt the mobile device user for one or more of user identifiable biometric data, personal data, and social media data in order to authenticate the user. In some implementations, the consumer's mobile device periodically communicates with the meta-wallet server computer to download additional and/or updated information, if required, and/or to download updates to the meta-wallet application program. For example, the meta-wallet application program may include instructions to cause the processor of the user's device to check for updates to business rules by one or more issuer financial institutions concerning one or more of the payment card accounts in the user's digital wallet because such updates may impact the level of security and/or the types of data required from the user for use during future transactions, and thus such updated business rules need to be (and would be) downloaded to the user's mobile device.

A number of terms will be used herein. The use of such terms are not intended to be limiting, but rather are used for convenience and ease of exposition. For example, as used herein, the terms "consumer," "cardholder," "person," and "user" may be used interchangeably, and such terms are used herein to refer to an individual who uses the meta-wallet service. In addition, the terms "payment card" and "payment device" may be used interchangeably, and may refer to such items or devices as a traditional plastic or embossed magnetic stripe card, a chip card (such as an EMV card) or an RFID card (such as a PayPass™ or MasterPass™ payment card). Pursuant to some embodiments, as used herein, the term "payment card" or "payment device" may also include a mobile device (such as a payment-enabled mobile telephone or payment-enabled tablet computer) running a payment application that includes stored payment account information.

Figure 1A:
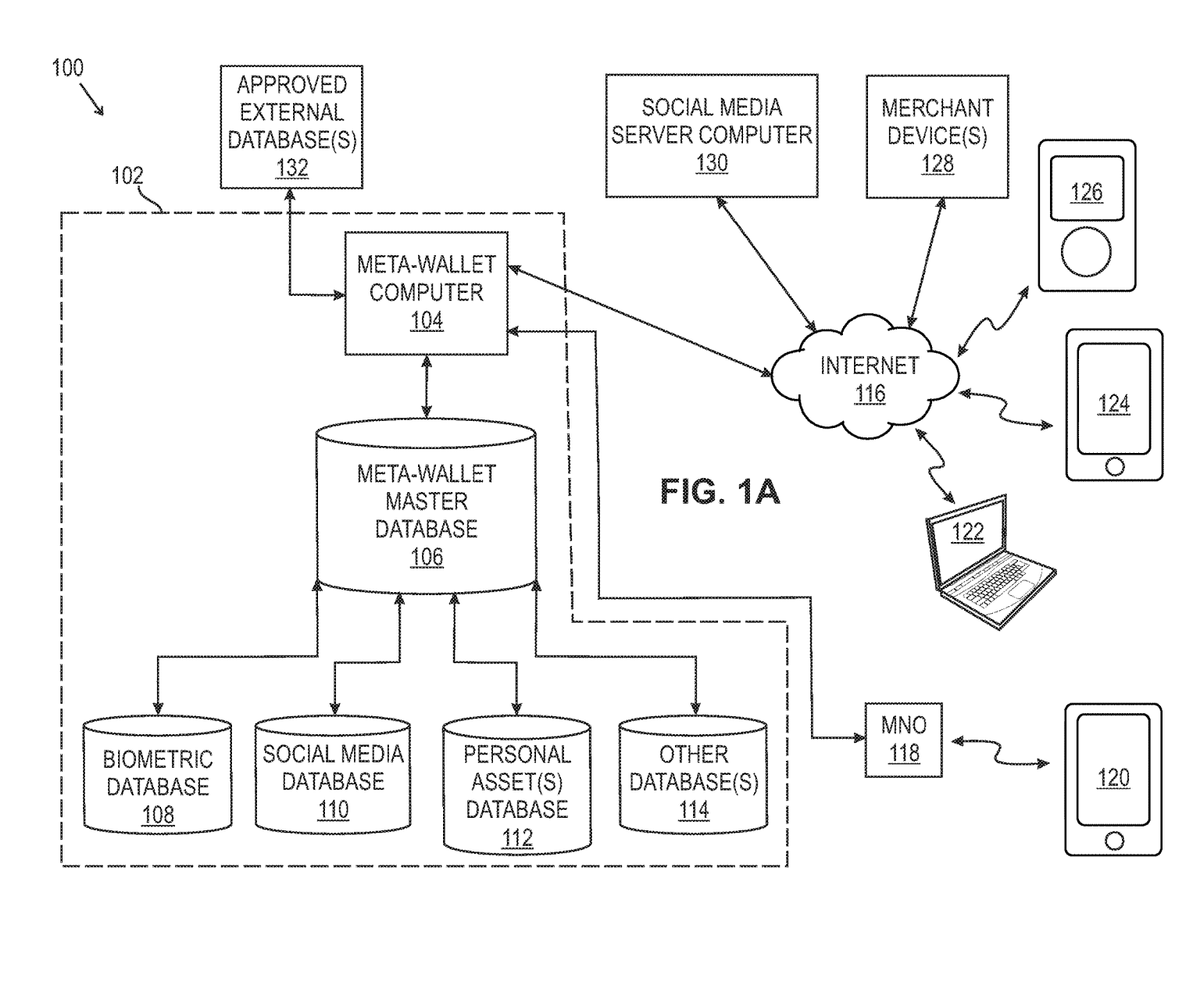
FIG. 1A is a block diagram of a meta-wallet user authentication system that includes components configured to operate in accordance with aspects of processes according to the disclosure.

FIG. 1A is a block diagram of a meta-wallet user authentication system 100 including components configured to operate in accordance with aspects of the processes described herein. It should be understood that the various components shown in FIG. 1A may be a subset of a larger system, and that more or less components and/or devices may be utilized. In addition, although specific embodiments are described herein, it should be understood that this is for illustrative purposes only and that different components and/or configurations could be used without departing from the spirit and scope of this disclosure.

Referring again to FIG. 1A, a meta-wallet system 102 includes a meta-wallet computer 104, a meta-wallet master database 106, a biometric database 108, a social media database 110, a personal assets database 112, and other database(s) 114. The meta-wallet computer 104 may include one or more computers or computer systems, and the meta-wallet system platform 102 may be operably connected (either wirelessly or wired, for example, by fiber-optic cabling or the like) to various different types of electronic devices, either directly and/or through one or more computer networks and/or communications networks (such as the Internet 116 or a mobile network operator (MNO) 118). In particular, a user or consumer may use one or more mobile devices, such as a mobile telephone 120 (which may be a Smartphone), laptop computer 122, tablet computer 124, and/or digital music player 126 (or other electronic device) to communicate with the meta-wallet system 102. In the case of a cell phone or mobile telephone 120, a user may communicate with the meta-wallet computer 104 via the MNO 118, or in some cases via the Internet 116 (if the mobile telephone has that capability). The meta-wallet system 102 may also be configured for communicating with merchant devices 128, such as point-of-sale (POS) terminals or merchant mobile devices, and social media server computers 130 via the Internet 116, or via other types of computer networks (not shown). In some embodiments, the meta-wallet system platform 102 may also be configured for communications with one or more approved external databases 132. The external databases 132 may include, for example, a transit authority user database, employee database(s) of a company or companies, and the like.

The meta-wallet system platform 102 is operable to provide user authentication services to persons or users such as consumers and/or employees and/or commuters, to facilitate various types of operations. Examples of operations that may involve use of the meta-wallet service platform 102 include, but are not limited to, purchase transactions between consumers and merchants (for example, in a retail store environment or online via a merchant's website), entry by a person (such as an employee) to an office building or manufacturing facility, and/or entry by a commuter to a transit authority facility such as a railway station or a bus station.

Figure 1B:
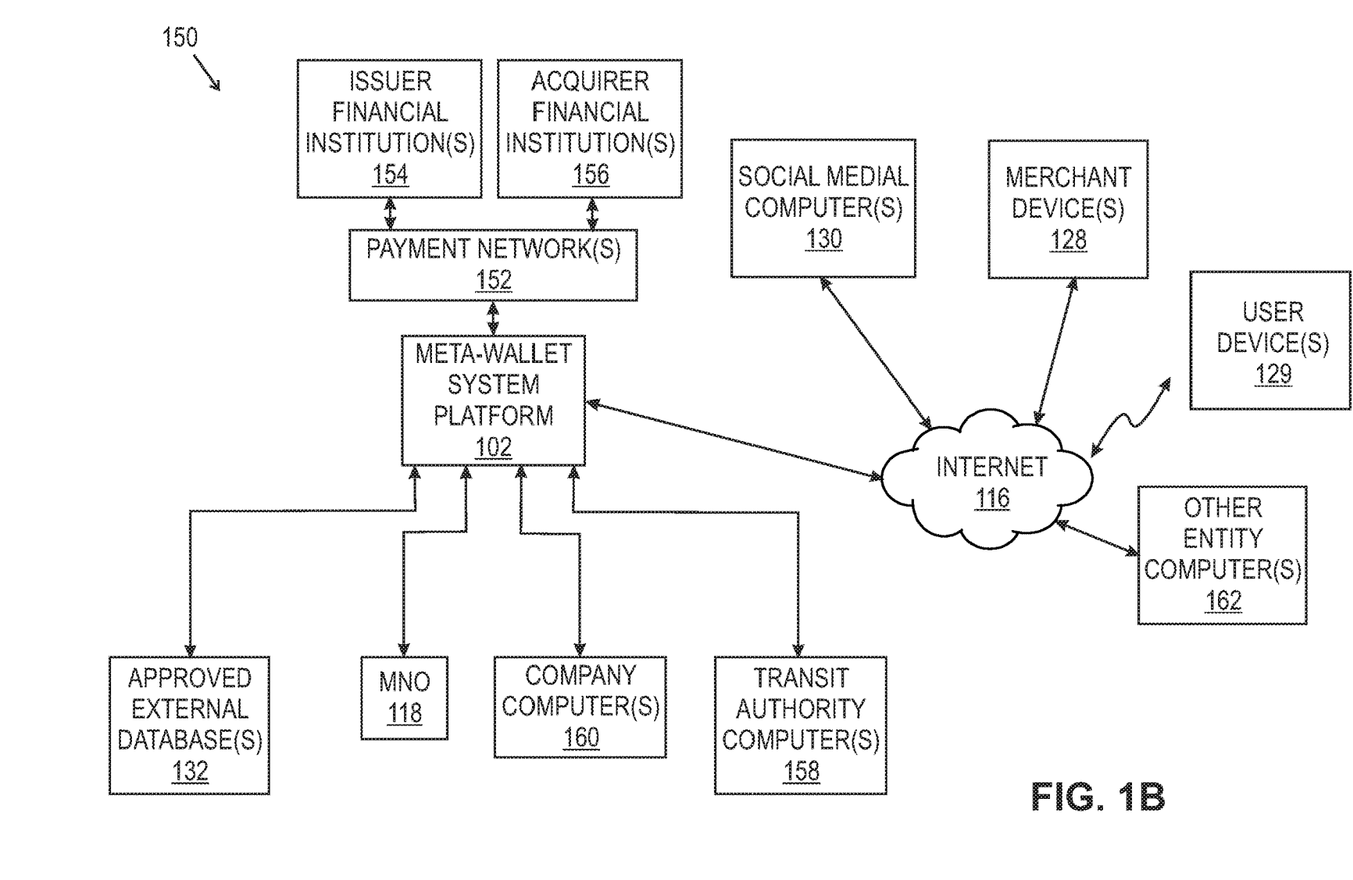
FIG. 1B is a meta-wallet system overview block diagram according to some embodiments of the disclosure.

FIG. 1B is a meta-wallet system overview block diagram 150 according to some embodiments. The meta-wallet system platform 102 is operably connected to the Internet 116, the MNO 118 and the Approved External database(s) 132 (as also shown in FIG. 1A). FIG. 1B also illustrates that the meta-wallet system platform 102 may be operably connected to one or more payment networks 152, which are connected to one or more Issuer financial institutions (FIs) 154 and one or more Acquirer FIs 156, which connections may be via one or more secure connections. The payment networks 152 along with the Issuer FIs 154 and Acquirer FIs 156 can be utilized when a meta-wallet user wishes to perform a purchase transaction. In addition, the meta-wallet system platform 102 is operably connected to transit authority computers 158, company computers 160, and MNOs 118. The meta-wallet system platform 102 may also be operably connected to social media computers 130, merchant devices 128, user devices 129 and other entity computers 162 via the Internet 116. Thus, the meta-wallet system platform 102 may be configured for enrolling and/or registering users and/or companies and/or organizations and/or entities and to obtain and/or store information (such as business rules and/or company rules and/or authentication rules) associated with and/or that may be required by such users and/or companies and/or organizations and/or entities.

Figure 2:
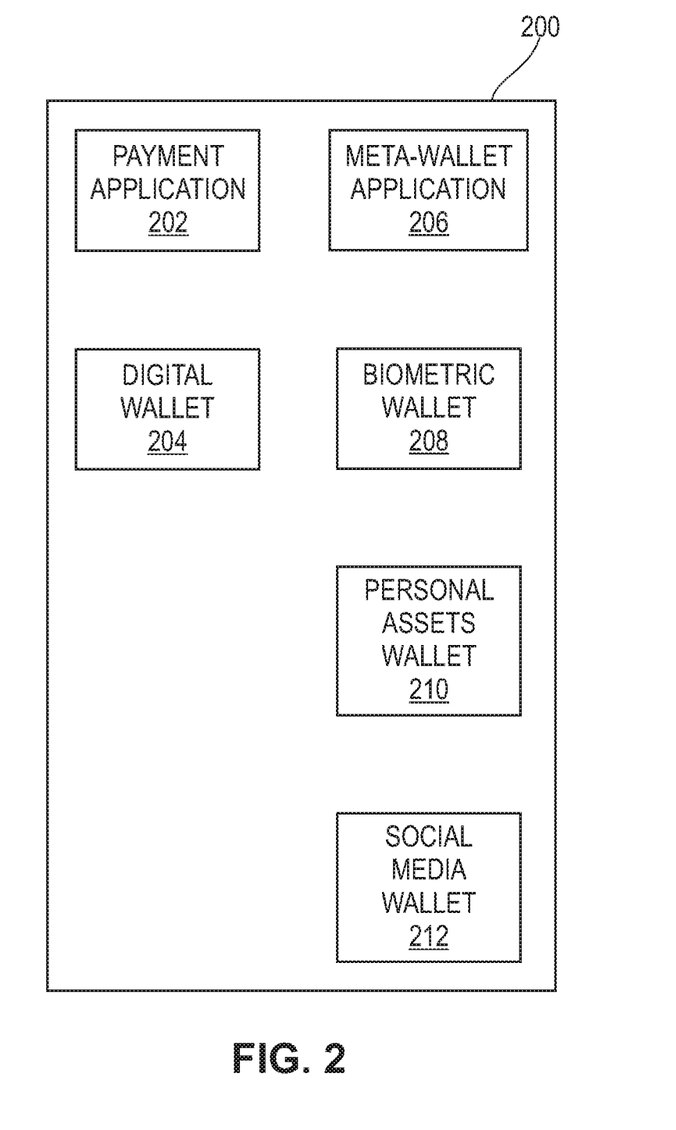
FIG. 2 is a block diagram of a secure memory of a user's payment-enabled mobile device to illustrate some software aspects of the meta-wallet service according to an embodiment of the disclosure.

FIG. 2 is a block diagram of an embodiment of a secure memory 200 of a user's payment-enabled mobile device (such as the Smartphone 120 of FIG. 1) to illustrate some software aspects of the meta-wallet service. In particular, in this example the user's mobile device 200 contains circuitry (not shown) that is capable of performing purchase transactions, and thus the consumer was required to enroll in a known manner with a mobile device network operator and/or with a payment system operator. As part of the enrollment process, the consumer downloaded a payment application 202 into a secure memory of the mobile device. The consumer also set-up and/or loaded a digital mobile wallet 204 that contains personal financial data, such as data concerning one or more credit card accounts, debit card accounts, reward card accounts, gift card accounts, merchant loyalty card accounts, and/or other types of financial accounts and the like. As is known, such a digital wallet can be used by the consumer to conduct electronic payment transactions with a merchant, for example, by selecting a payment card account from the digital wallet and then providing identification data (such as a mobile personal identification number (mPIN)) that authenticates the consumer to the payment system (not shown). The payment system then typically coordinates processing between an issuer financial institution (FI) that issued the consumer's payment card account, and an acquirer FI associated with the merchant (not shown). If all is in order (i.e., the payment system authenticated the consumer and was informed that the consumer's payment card account has a sufficient credit line to cover the transaction amount), then the purchase transaction is consummated. In accordance with processes disclosed herein, the consumer may enroll in and utilize a meta-wallet service to easily and securely provide consumer authentication data without the need to remember a personal identification number (PIN) (such as an mPIN) or a password. It should be understood that, in some embodiments, consumers, payment networks, Issuer FIs and/or Acquirer FIs may also be required to enroll or to register with the meta-wallet service platform (for example, via a website or webpage hosted by a meta-wallet computer system) before meta-wallet payment transaction processing can occur as described herein for a meta-wallet user.

Referring again to FIG. 2, in some implementations, the user registers for the meta-wallet service, for example, at a meta-wallet website, and then downloads and saves a meta-wallet application program 206 into a secure location on the user's mobile device (such as in a secure memory location of a Smartphone). The meta-wallet application program 206 is operable to analyze transaction information to determine a type of transaction that is occurring, and then, based on that data and data supplied by the person during registration, to prompt the mobile device user for one or more of user identifiable biometric data, personal data, and social media data in order to authenticate the user. Thus, during the registration process, the user may also be prompted to utilize a touch screen and/or biometric sensors (not shown) of the user's mobile device to enter personally identifiable biometric data, which may then be stored in the biometric database 108 (see FIG. 1) and stored in a biometric wallet 208 of the user's mobile device. Examples of biometric data which may be obtained from an user and stored in the biometric database and/or in the biometric wallet includes, but is not limited to, face data (i.e. a picture taken with a mobile device camera of the user's face, and/or iris scan data), fingerprint data, voice data, audible data (for example, voice data and/or hand clapping sounds), a walking style data, and/or signature data.

In some embodiments, the user may also be prompted during the registration process to enter personally identifiable assets data by, for example, utilizing the touch screen or keyboard (not shown) of the user's mobile device. The personal assets data may be stored in the personal assets database 112 (see FIG. 1) of the meta-wallet system 102 and/or the personal assets wallet 210 of the user's mobile device. Examples of personal assets data which may be obtained from an user and stored in the personal assets database and/or in the personal assets wallet includes, but is not limited to, license plate data (i.e. the state in which the license was issued and the plate number), a mobile telephone number, automobile data (i.e., the make, year, type and color of the user's automobile; such as a 2012 silver Toyota Camry four door sedan), motorcycle data (i.e., the make, year, type and color of the user's motorcycle; such as a 2010 blue Harley Davidson Road King), and/or any other information associated with a personal asset that is personally identifiable to the user.

In addition, in some embodiments the user may also be prompted during the meta-wallet registration process to enter personally identifiable social media data by, for example, utilizing the touch screen or keyboard (not shown) of the user's mobile device. The social media data may be stored in the social media database 110 (see FIG. 1) and/or the social media wallet 212 of the user's mobile device. Examples of social media data which may be obtained from the user and stored in the social media database 110 and/or in the social media wallet 212 includes, but is not limited to, a Twitter™ handle, a Facebook™ identifier and/or password, one or more e-mail addresses and/or passwords, an Instagram™ handle, a Pinterest account identifier, and/or identifiers and/or logins for social media aggregators such as Janrain and Gigya.

In some embodiments, the meta-wallet application 206 includes instructions operable to cause a processor of the consumer's mobile device to periodically and/or automatically communicate with the meta-wallet server computer 104 (see FIG. 1) to check for any updates and the like. Thus, in some embodiments, the meta-wallet application program may automatically download updated data and/or updated information and or application instruction updates when found. In addition, if there are any updates to business rules by one or more issuer financial institutions concerning one or more of the payment card accounts in the user's digital wallet, then such updates may also be downloaded because one or more of such updated rules may impact the level of security and/or the types of data required from the registered meta-wallet user for use during future purchase transactions and/or for other activities (such as entry to a secure building). The meta-wallet application 206 may also be configured to upload data and/or information from the user's mobile device to the meta-wallet system 102 if necessary, for example, to update and/or change personal asset data and the like.

Figure 3:
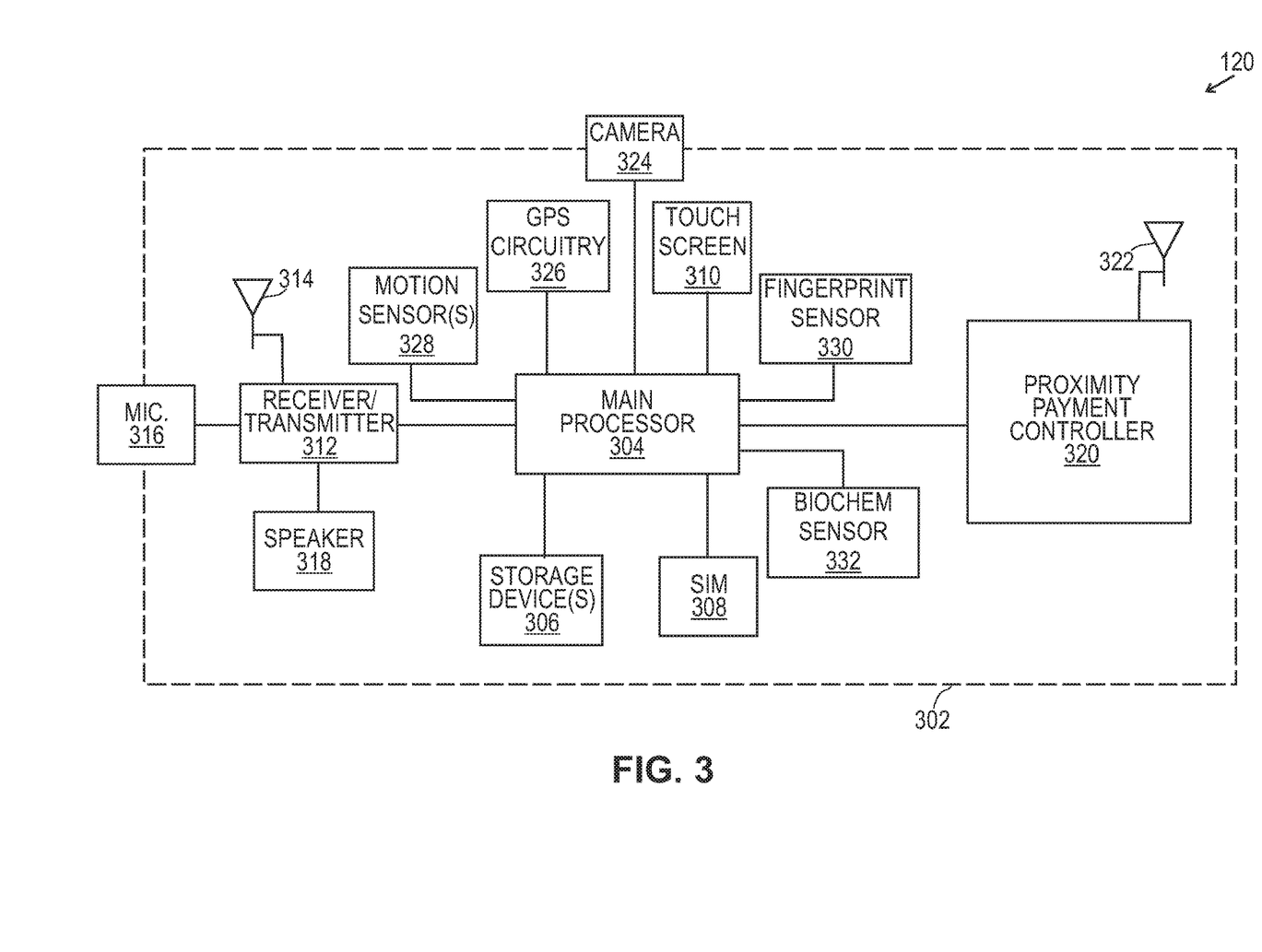
FIG. 3 is a block diagram of an embodiment of a user's mobile device to illustrate some hardware aspects for use with the meta-wallet service in accordance with the disclosure.

FIG. 3 is a block diagram of an embodiment of a user's mobile device 120 to illustrate some hardware aspects of the device that may be utilized during meta-wallet service processing. In this example, the user's mobile device is a mobile telephone 120 (see FIG. 1, which may be a Smartphone) that may (but need not) have capabilities for functioning as a contactless payment device. In particular, the user's mobile device 120 may be a payment-enabled mobile device capable of initiating payment transactions in a payment card system. Operation of a mobile telephone to initiate funds transfers via a payment card system is described, for example, in commonly assigned U.S. published application no. 2008/0249928, filed Aug. 10, 2007, entitled "Payment Card Based Remittance System with Designation of Recipient By Mobile Telephone Number", which is incorporated herein by reference. In its hardware aspects the mobile telephone 120 may be entirely conventional, and indeed in some of its software aspects it also may be conventional, and may provide novel functionality as described herein in some cases through interaction (via a conventional browser) with a web page that supports initiation of purchase transactions and/or other operations. In other embodiments, however, novel functionality as described herein may result at least partially from software and/or firmware that programs or instructs one or more processors of the mobile telephone 120.

The mobile telephone 120 may include a conventional housing (indicated by dashed line 302) that contains and/or supports the other components of the mobile telephone 120. The mobile telephone 120 further includes a main processor 304 for controlling over-all operation of the mobile telephone 120. The main processor 304 is suitably programmed to allow the mobile telephone 120 to engage in data communications and/or text messaging with other wireless devices and/or electronic devices, and to allow for interaction with web pages accessed via browser software, which is not separately shown. Other components of the mobile telephone 120, which are in communication with and/or are controlled by the control circuitry 304, include one or more storage devices 306 (for example, program memory devices and/or working memory, and the like), a conventional subscriber identification module (SIM) card 308, and a touch screen display 310 for displaying information and for receiving user input.

The mobile telephone 120 also includes conventional receive/transmit circuitry 312 that is also in communication with and/or controlled by the main processor 304. The receive/transmit circuitry 312 is operably coupled to an antenna 314 and provides the communication channel(s) by which the mobile telephone 120 communicates via the mobile network (not shown). The mobile telephone 120 further includes a conventional microphone 316 operably coupled to the receive/transmit circuitry 312. Of course, the microphone 316 is for receiving voice input from the user.

In addition, a loudspeaker 318 is also operably coupled to the receive/transmit circuitry 312 and provides sound output to the user.

The mobile telephone 120 may also include a proximity payment controller 320 which may be an integrated circuit (IC) or chipset of the type commonly embedded in contactless payment cards. The proximity payment controller 320 is operably connected to an antenna 322 and operates so as to interact with a Radio Frequency Identification (RFID) and/or Near Field Communication (NFC) proximity reader (not shown), which may be associated, for example, with a Point-of-Sale (POS) terminal of a merchant. The proximity payment controller 320 provides information, such as a user's payment card account number, for conducting a purchase transaction at the POS terminal. For example, the proximity payment controller 320 may be designed and/or programmed to operate in accordance with the well-known PayPass™ or MasterPass™ standard (promulgated by the assignee hereof) for contactless payment applications.

The mobile telephone 120 may include one or more sensors and/or circuitry that functions to provide data concerning the mobile telephone and/or the user. In particular, the mobile telephone 120 may be a Smartphone that includes an integrated camera 324 operably connected to the main processor 304 and that can be utilized for various functions. For example, the integrated camera 324 can take pictures, can be operated to read a two-dimensional (2D) barcode to obtain information, and/or can be operated to take a picture of the user for authentication purposes. The mobile telephone 120 may also include Global Positioning System (GPS) circuitry 326 operably connected to the main processor 304, and operable to generate information concerning the location of the mobile telephone. In addition, the mobile telephone may include one or more motion sensor(s) 328, a fingerprint sensor 330, and a biochemical sensor 332. The motion sensor(s) 328 may be operable to generate motion data, for example, that can be associated with the user's walking style or gait, and/or to generate force data associated with, for example, the force generated by the user's finger when he or she touches the touch screen 310. The fingerprint sensor 330 may include a touch pad or other component (not shown) for use by the user to swipe his or her index finger when fingerprint data is required for an operation (such as entry to a building). The biochemical sensor 332 may include one or more components and/or sensors operable to obtain biological data, such as breath data, and/or other types of data associated with the user's health from the user of the mobile device 120. In such cases, the main processor 304 and receiver/transmitter circuitry 312 may be operable to transmit the generated GPS data and/or motion data and or biometric data to the meta-data system 120 (see FIG. 1) for processing. The user's mobile device may also contain one or more other sensors, such as an iris scanner device for generating iris scan data, which may be useful for identifying biometric or other personal data of a metal-wallet user.

As mentioned above, the consumer's mobile device (such as the mobile telephone or Smartphone 120) may be configured and/or programmed to operate in accordance with the PayPass™ and/or MasterPass™ standard, so that the mobile device can be utilized to make payments. In particular, the mobile MasterCard® MasterPass™ system and processes are based on industry standards for contactless payments and consists of a MasterPass™ contactless payment application running on a secure chip, for example, in a consumer's mobile telephone. Consumers or cardholders who use MasterPass™ get through checkout lines faster because sales clerks don't have to deal with cash or cards, and such consumers have the flexibility to spend whatever they want instead of being limited to the cash they have in their pocket. In addition, the MasterPass™ architecture provides integration with and/or access to other services, such as the meta-wallet service. In particular, in some implementations a consumer who has already registered to utilize MasterPass™ can easily register to utilize the meta-wallet system. For example, in some embodiments when the consumer utilizes MasterPass™ to make a purchase at a Merchant website or a retail store, if that consumer has not yet used the meta-wallet system, a prompt may be provided on the display screen of the consumer's mobile device that asks the consumer if he or she would like to register for the meta-wallet service. If the consumer indicates an interest, the consumer may be redirected to a meta-wallet website and prompted to provide information concerning his or her payment card accounts, and to provide biometric data and/or personal assets data and/or social media data into input fields provided of meta-wallet web pages provided or hosted by the meta-wallet system 102. In some implementations, the consumer or user may access the meta-wallet website through a merchant device, a kiosk, a laptop computer, a desktop computer, or other digital device. In some embodiments, the meta-wallet website and/or the meta-wallet system 102 is operated by MasterCard International Incorporated (the assignee hereof), or an associate or affiliate thereof, which entity enrolls or registers persons (such as consumers) and/or merchants and/or issuing banks and/or acquirer banks for the meta-wallet service and then provides the services described herein. It should be understood that the meta-wallet system may also be configured to link and/or communicate with other internal systems or external systems through a tokenization architecture, wherein a token may be generated or created that can identify and connect a user to any particular system or systems required to validate and/or authenticate and/or exchange information or data for purposes of authenticating the user. Tokens generated in such scenarios can act as a common link or unique identifier to connect a particular consumer with any of his or her wallets in the meta-wallet architecture.

Figure 4:
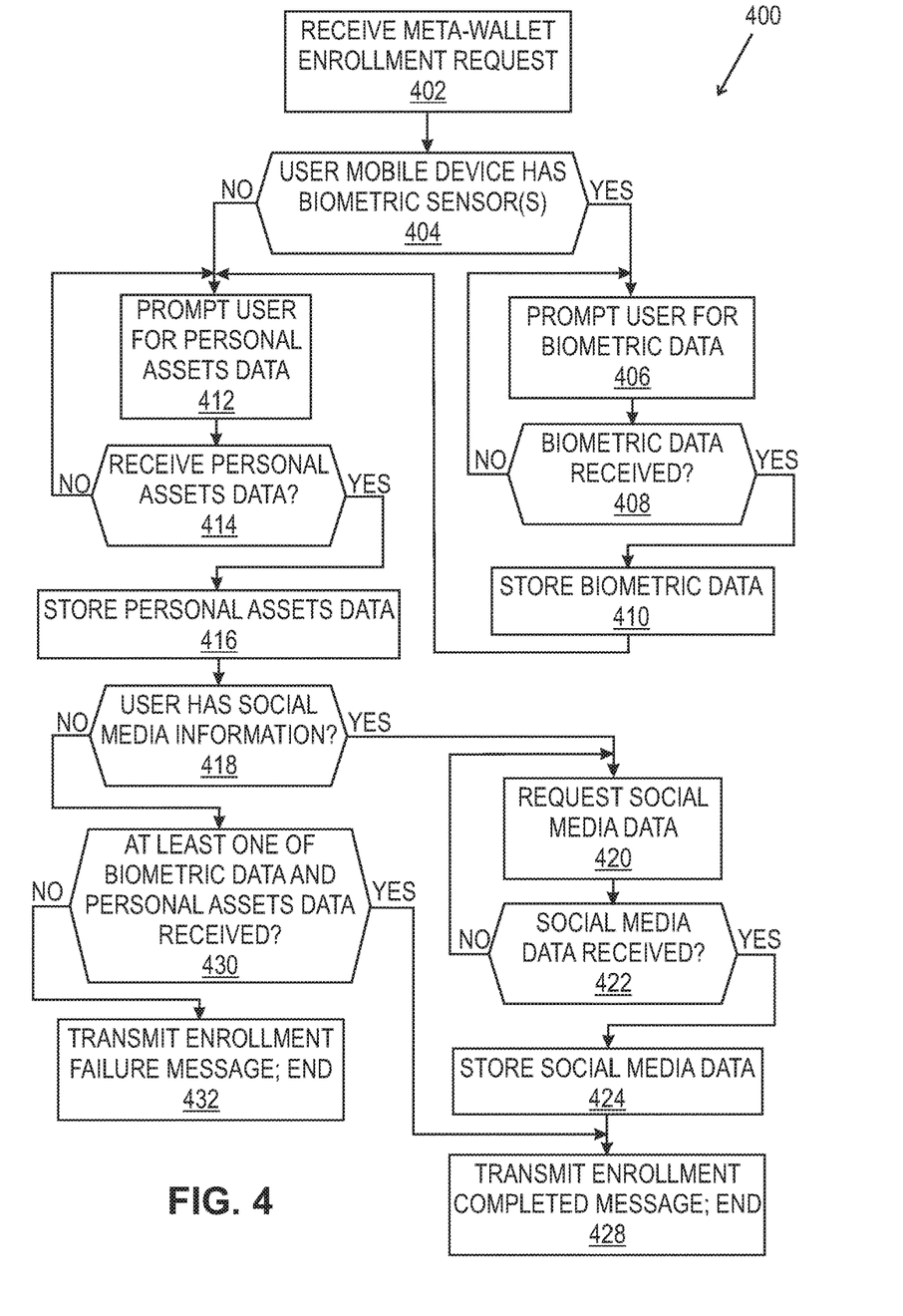
FIG. 4 is a flowchart illustrating a meta-wallet enrollment process according to an embodiment of the disclosure.

FIG. 4 is a flowchart of a meta-wallet enrollment process 400 according to an embodiment. A meta-wallet server computer 104 (see FIG. 1) receives 402 a meta-wallet service enrollment request, which may originate from a user's mobile device or from another type of user device, such as a desktop computer. In some embodiments, the meta-wallet service enrollment request includes information that identifies the type of mobile device being used by the user, whereas in other embodiments the meta-wallet server computer requests input from the user regarding the type of mobile device to be used. In some embodiments, the information concerning the user's mobile device includes information or data regarding the types of sensors available and/or the sensor capabilities of the user's mobile device.

Referring again to FIG. 4, the meta-wallet server computer next determines 404 whether or not the user's mobile device includes one or more biometric sensors. If so, then the meta-wallet server computer prompts 406 the user for biometric data (for example, fingerprint data, iris scan data, breath data, voice data, and the like). If the appropriate biometric data is received 408, then the meta-wallet server computer stores 410 that biometric data in the biometric database 108 and the process continues with the meta-wallet server computer prompting 412 the user for personal assets data. But if biometric data is not received in step 408 within a predetermined amount of time (which may be set to a reasonable range, for example, 15 to 30 seconds or longer, in some implementations up to several minutes), then the process may loop back to step 406 wherein the user will again be prompted to enter the biometric data. In some implementations, if the user fails to enter the biometric data after being prompted several times (for example, after being prompted three (3) time to enter biometric data), then the biometric acquisition phase may time-out. When the biometric acquisition phase times out, in some implementations the process continues with step 412, wherein the meta-wallet server computer prompts 412 the user for personal assets data. But in other implementations, if the user's mobile device is capable of capturing biometric data and the user does not provide such biometric data after being prompted to do so, then the process ends and a failure message transmitted to the user device for display to the user (which is not shown in FIG. 4).

If in step 404 it is determined that the user's mobile device does not include biometric sensors (and thus is not capable of transmitting biometric data), or after biometric data was stored in step 410, then the meta-wallet server computer prompts 412 the user for personal assets data. If the meta-wallet server computer determines 414 that the personal assets data has not been received within a predetermined amount of time (which may be set to a reasonable range, for example, about 30 to 60 seconds or longer), then the process loops back to step 412 wherein the user will again be prompted to enter the personal assets data. If the user provides appropriate personal assets data 414, then the meta-wallet server computer stores 416 that personal assets data in the personal assets database 112 and the process continues with the meta-wallet server computer asking 418 the user if he or she would like to include social media information. However, in some implementations, if in steps 412 and 414 the user fails to enter personal assets data after being prompted several times to do so (for example, after being prompted twice) or after a predetermined time period to do so expires, then the personal assets acquisition phase may time-out, and the process may continue with step 418. But in other implementations, if no personal assets data has been received within the predetermined time limit, then the process ends and the user may be provided with a failure message (not shown).

Referring again to FIG. 4, the enrollment process 400 continues with the meta-wallet server computer requesting 418 whether the user would like to input social media information. If so, then the meta-wallet server computer prompts 420 the user for social media data. If the meta-wallet server computer determines 422 that the social media data has not been received within a predetermined amount of time (which again, may be set to a reasonable range such as about 30 to 60 seconds or longer), then the process loops back to step 420 wherein the user will again be prompted to enter his or her social media data (which may consist of multiple social media data points). If the appropriate social media data is received 422, then the meta-wallet server computer stores 424 that social media data in the social media database 110. The meta-wallet server computer 104 then transmits 428 a meta-wallet service enrollment completion message to the user (which may be transmitted, for example, to the user's mobile device (such as a Smartphone), or to another device that the user utilized to enroll). The process then ends.

However, if in step 418 the user indicates that he or she does not have any social media information (or does not wish to use input any social media information), then the meta-wallet server computer determines 430 if at least one of biometric data and personal assets data has been received. If so, then the meta-wallet server computer then transmits 428 a meta-wallet service enrollment completion message to the user as explained above, and the process then ends. However, if the meta-wallet server computer determines 430 that neither biometric data nor personal assets data has been received, then the meta-wallet server computer transmits 432 a meta-wallet enrollment failure message to the user as explained above, and the process then ends.

It should be understood that the process illustrated by FIG. 4 is just one example of a meta-wallet service registration process for enrolling users, such as consumers, payment card account holders, employees, commuters and the like persons. Thus, the meta-wallet service platform can be configured for communications with such users in various additional and/or different ways to obtain information and/or data relevant to user registration. For example, in some embodiments the meta-wallet system platform may be configured for communicating with services that aggregate and/or act as a gateway to various social media channels. Thus, communications between the meta-wallet computer and various social media computers that host websites, for example, can be made directly between the meta-wallet computer and such social media computers, or may be made between the meta-wallet computer and a gateway service that is an aggregator and/or that has access to such social media channels.

Figure 5:
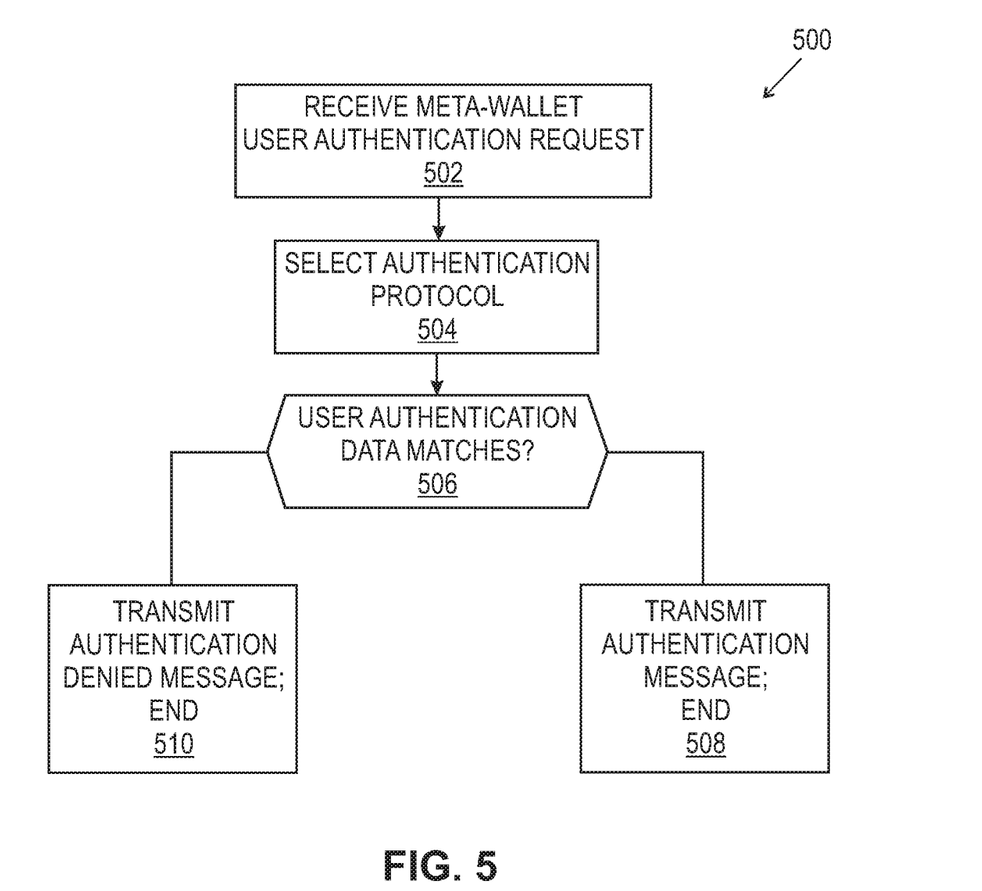
FIG. 5 is a flowchart illustrating a user meta-wallet authentication process in accordance with embodiments of the disclosure.

FIG. 5 illustrates a user meta-wallet user authentication process 500 in accordance with embodiments disclosed herein. After the user has registered (as explained above) for the meta-wallet service, he or she may wish to perform or conduct an activity that requires user authentication and/or authorization, for example, a purchase transaction or entry to a secure facility or entry to a commuter railroad station. In such cases, the meta-wallet computer may receive 502 a meta-wallet user authentication request, which in some embodiments includes a unique meta-wallet identifier (assigned to the meta-wallet user during the enrollment process), a context identifier, and at least one of user biometric data, user personal assets data, and user social media data, from the user's device. The context identifier may be determined by the meta-wallet application resident on the user's device and may be based on activity data and/or transaction data associated with the type of activity that the user is trying to engage in (for example, a purchase transaction or access to a commuter train station or subway platform). The at least one of user biometric data, user personal assets data, and user social media data may be entered by the meta-wallet user, for example, by using a touch screen of the user's device and/or by use of one or more sensors (such as a fingerprint sensor) associated with the user's device. In addition, in some cases the meta-wallet user authentication request may include additional information, such as purchase transaction information received from a merchant's device (such as a point of sale (POS) terminal). The purchase transaction information may include data such as an amount due for the purchase, a merchant identifier, and product identification details such as descriptions and/or identifiers for each item being purchased (and its associated purchase price). In some embodiments, the customer may manually input the transaction information into his or her mobile device before transmitting the meta-wallet authentication request for a purchase transaction.

Referring again to FIG. 5, the meta-wallet computer selects 504 (or determines), based on the context identifier and on the meta-wallet identifier, a security protocol or an authentication protocol for the particular activity. In some implementations, the meta-wallet computer looks up the security protocol which was pre-set by the meta-wallet user during the enrollment process (which may have been created in association with certain requirements, such as business rules required by one or more financial institutions). The meta-wallet computer next determines 506 if the at least one of user biometric data, user personal assets data, and user social media data provided by the meta-wallet user matches the stored meta-wallet data in accordance with the security protocol. If so, then the meta-wallet computer transmits 508 a user authentication message to one or both of the user device and the entity computer associated with the entity identifier. The entity computer may be, for example, a merchant's POS terminal, a merchant electronic device (such as a merchant tablet computer or merchant computer system), a payment processing computer associated with a merchant secure-checkout webpage, a transportation authority computer operably connected to an entryway turnstile of a subway station, a company computer operably connected to a company facility entryway, and the like. The authentication message may, in some embodiments, enable the meta-wallet user to consummate the transaction or enable furtherance of the activity (i.e., provide entry to a train platform or company building).

In some implementations, in addition to meta-wallet user biometric data, meta-wallet user personal assets data, and meta-wallet user social media data, the meta-wallet computer may receive location data from the meta-wallet user's device. If the location data indicates that the meta-wallet device is currently located in what may be considered to be a moderately dangerous and/or dangerous area or an area with an increased rate of payment fraud activities, then the meta-wallet computer may be operable to modify the meta-wallet authentication data requirements for that particular activity and/or transaction. For example, the meta-wallet computer may prompt the meta-wallet user to provide further user identification data (for example, fingerprint scan data and/or a voice data) to satisfy the modified meta-wallet authentication data requirements.

However, if in step 506 the meta-wallet computer determines that the at least one of user biometric data, user personal assets data, and user social media data received from the meta-wallet user does not match the stored meta-wallet data in accordance with the security protocol, then the meta-wallet computer transmits 508 an authentication denies message to one or both of the user device and to an entity computer associated with the entity identifier. The process then ends.

In some implementations, during an authentication process, the meta-wallet computer may prompt the meta-wallet user to provide appropriate authentication data. In some cases, a prompt is generated and transmitted to the user's device and then displayed on a display screen to the user after the meta-wallet computer receives that user authentication request. The prompt may require the meta-wallet user to provide additional and/or specific authentication data, such as one or more of biometric data, personal assets data and/or social media data, which may be dependent on the context of the activity or transaction. Such authentication data may be entered by the meta-wallet user, for example, by using a touch screen and/or by using one or more sensors associated with the user's device.

It should be understood that, with respect to a purchase transaction, the meta-wallet authentication application may function in tandem with a payment application resident on the meta-wallet user's device. Thus, a meta-wallet user and/or consumer may select a payment card account for use in the purchase transaction and utilized the meta-wallet authentication service to process data required to authenticate the meta-wallet user so that the purchase transaction will be authorized. Thus, in an implementation the meta-wallet user first provides authentication data as described herein, and then transmits payment account data to a merchant device for payment transaction processing. In an implementation, the merchant device transmits a purchase transaction request to the merchant's acquirer financial institution (FI), which contacts a payment network that indentifies the consumer's issuer financial institution (FI) and then forwards an authentication and/or authorization request for the purchase transaction to the issuer FI. If all is in order, the issuer FI authorizes a transfer of funds from that selected payment card account to the merchant's payment account in the acquirer FI. The vehicle for the funds transfer may therefore be a conventional payment transaction of the type now supported by at least one payment card system. Upon authorization and/or completion of the payment transaction, the acquirer FI may confirm to the merchant that the funds transfer has occurred (or is assured to occur subsequently during conventional clearing operations). In response to receiving the funds transfer confirmation, the merchant then transfers ownership of the goods to the consumer, or may accept the confirmation as payment for services rendered or to be rendered to the consumer. Thus, a purchase transaction involving the meta-wallet service may include utilizing a conventional payment network, and/or the internet, and/or any other network and/or payment channel.

Figure 6:
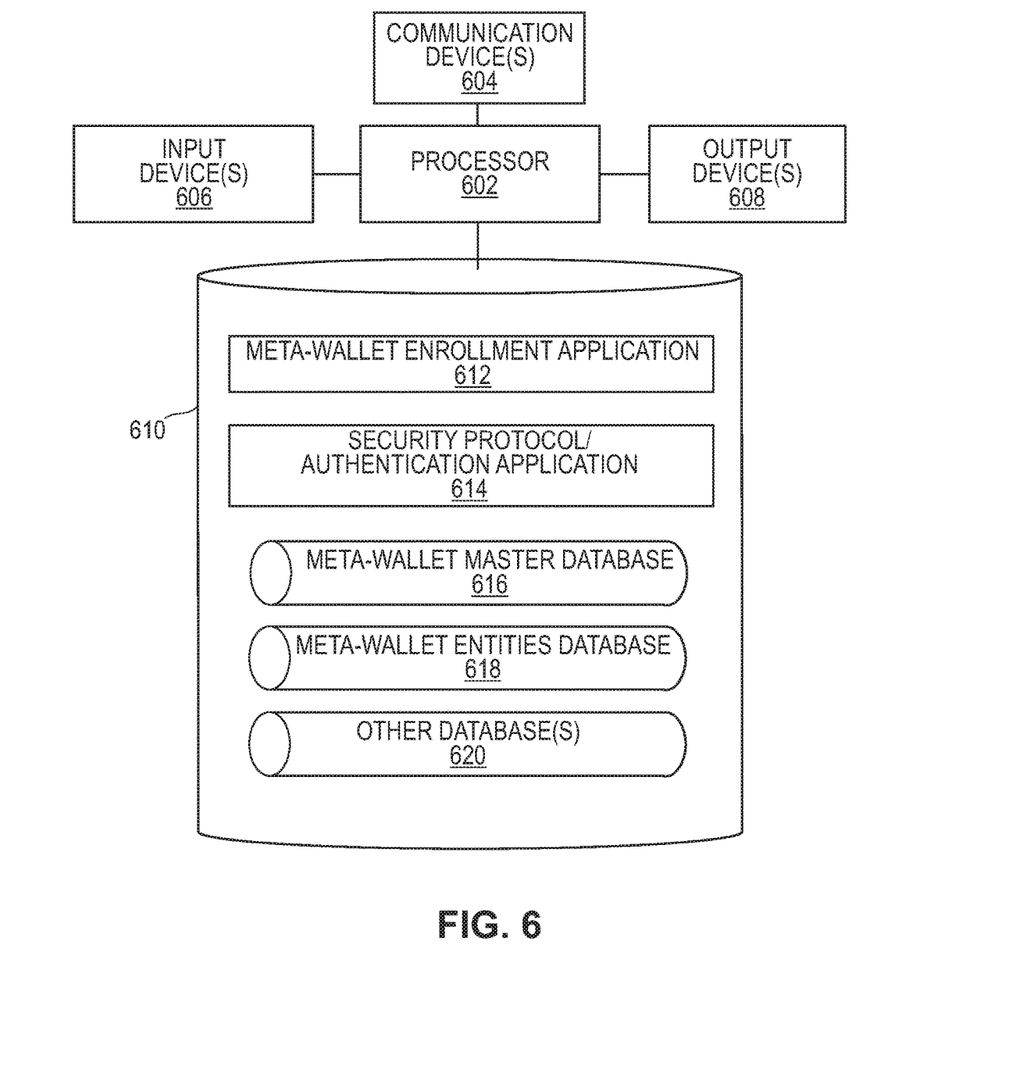
FIG. 6 is a block diagram illustrating a meta-wallet computer according to an embodiment of the disclosure.

FIG. 6 is a block diagram 600 of a meta-wallet computer 600 according to an embodiment. A computer processor 602 is operatively coupled to one or more communication device(s) 604, one or more input device(s) 606, one or more output device(s) 608, and a storage device 610.

The computer processor 602 may be constituted by one or more conventional processors. Processor 602 operates to execute processor-executable steps, contained in program instructions described below, so as to control the smart preferences computer 600 to provide desired functionality.

Communication device(s) 604 may be used to facilitate communication with, for example, other devices (such as user mobile devices 120 to 126, merchant devices 128, social media computers 130, MNOs 118 and/or approved external devices 132 such as cardholder Issuer FI computers, merchant server computers, and/or merchant Acquirer FI computers). Communication device(s) 604 may, for example, have capabilities for sending and receiving messages and/or data over mobile telephone networks, via the Internet, via wireless networks, and/or engaging in data communication over conventional computer-to-computer data networks.

Input device(s) 606 may comprise one or more of any type of peripheral device typically used to input data into a computer. For example, the input device(s) 606 may include a keyboard and a mouse. Output device(s) 608 may comprise, for example, a display device and/or a printer.

Storage device 610 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as flash memory. Thus, the storage device 610 is a non-transitory computer readable medium and/or any form of computer readable media capable of storing computer instructions and/or application programs and/or data. It should be understood that non-transitory computer-readable media comprise all computer-readable media, with the sole exception being a transitory, propagating signal.

Storage device 610 stores one or more programs or applications for controlling the processor 602. The programs comprise program instructions that contain processor-executable process steps of the meta-wallet computer 600, including, in some cases, process steps that constitute processes provided in accordance with principles of the present invention, as described in more detail below.

The programs stored by the storage device may include a meta-wallet enrollment application 612 that manages processes by which users (such as consumers, commuters and/or other persons) as well as entities (such as merchants, transit authority organizations, companies, and the like) register or enroll themselves and/or their devices and/or computers and/or computer systems with the meta-wallet service computer 600. In some embodiments, the meta-wallet enrollment process may allow users to enroll themselves by accessing, via their mobile devices 204, a suitable web page hosted by the meta-wallet services computer 600. The information obtained from the users during the enrollment process may include the authentication data described herein which enables the meta-wallet user to authenticate himself or herself without having to utilize a password and/or personal identification number (PIN). The information obtained from entities during the enrollment process may include identification data and/or business rules.

The storage device 610 may also store a security protocol/authentication application 614 for managing processes described herein for authenticating registered meta-wallet users. The security protocol/authentication application 614 may thus function to determine whether authentication data has been received from a registered meta-wallet user, whether or not the authentication data matches a predetermined authentication or security protocol, and then transmit the determination to one or both of the meta-wallet user's device and to one or more entities associated with the particular transaction or activity.

In addition, the storage device 610 may store one or more databases that are maintained by the meta-wallet computer 600. Among these databases may be a meta-wallet computer master database 616, which may store meta-wallet user biometric data, meta-wallet user personal assets data, and meta-wallet user social media data. The meta-wallet computer 600 may be operable to obtain meta-wallet data to populate such databases directly from meta-wallet users. Also included may be a met-wallet entities database 618 which may store data of participating entities, including business rules governing required authentication data that must be received from the meta-wallet user during an authentication process as related to particular types of activities or transactions, and any limitations or restrictions placed on meta-wallet users regarding such activities and/or transactions.

The application programs of the smart preferences computer 600 may be combined in some embodiments, as convenient, into one, two or more application programs. Moreover, the storage device 610 may store other programs, such as one or more operating systems, device drivers, database management software, web hosting software, security frameworks, tokenization and the like.

The flow charts and descriptions thereof herein should not be understood to prescribe a fixed order of performing the method steps described therein. Rather the method steps may be performed in any order that is practicable.

As used herein and in the appended claims, the term "payment card account" includes a credit card account or a deposit account that the account holder may access using a financial account such as a debit card account, store card account, loyalty card account, and/or or a gift card account. The term "payment card account number" includes a number that identifies a payment card account or a number carried by a payment card, or a number that is used to identify an account in a payment system that handles debit card and/or credit card transactions or to route a transaction in a payment system that handles debit card and/or credit card transactions. The term "payment card" includes a credit card or a debit card (including a pre-paid debit card) or a gift card or a store card. The term "payment card account" also includes an account to which a payment card account number is assigned. Thus a payment card account may include an account to which payment transactions may be routed by a payment system that handles debit card and/or credit card and/or gift card transactions, even if the account in question is not eligible to be charged for purchase transactions or other transactions. A payment card account may also include an account from which payment transactions may be routed by a payment system that handles debit card and/or credit card and/or gift card transactions, even if the account in question is not customarily used, or is not eligible, to be charged for purchase transactions.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A user authentication services system comprising:
a meta-wallet system platform;
a user mobile device configured for communication with the meta-wallet system platform; and
a plurality of entity computers associated with a plurality of entities, the entity computers configured for communication with the meta-wallet system platform;
wherein the meta-wallet system platform comprises a meta-wallet computer operably connected to a meta-wallet master database, the meta-wallet computer comprising a meta-wallet processor operably connected to a communication device and to a storage device storing instructions configured to cause the meta-wallet processor to:
receive, via the communication device from a user mobile device, a user authentication request comprising a combination of a meta-wallet identifier, an entity identifier associated with an entity device, a context identifier determined by a meta-wallet application resident on the user mobile device based on activity data, and at least one of user biometric data, user personal assets data personally identifiable to the user, and user social media data personally identifiable to the user;
determine, based on the meta-wallet identifier and the context identifier, that the user is a registered meta-wallet user, that the user defined a plurality of security protocols, and that the user is engaging in a predetermined type of activity defined by the context identifier;
select a security protocol from the plurality of security protocols defined by the user based on the type of activity defined by the context identifier;
determine that a combination of personally identifiable assets data and at least one of user biometric data and user social media data matches stored personal meta-wallet data associated with the registered meta-wallet user and thus satisfies the selected security protocol; and
transmit, via the communication device to at least one of the user mobile device and the entity computer associated with the entity identifier, a user authentication confirmation message.

2. The system of claim 1, further comprising at least one of a biometric database, a social media database, a personal assets database, and other database(s) operably connected to the meta-wallet master database.

3. The system of claim 1, further comprising at least one of an approved external database operably connected to the meta-wallet computer and a social media server computer operably connected to the meta-wallet computer.

4. The system of claim 1, wherein the plurality of entity computers is associated with at least one of merchants, companies, and transit authorities.

5. The system of claim 1, further comprising a payment network operably connected to the meta-wallet computer.

6. The system of claim 1, wherein the storage device stores further instructions, subsequent to the instructions for selecting the security protocol, instructions configured to cause the processor to:
determine that the at least one of user biometric data, user personal assets data, and user social media data does not match stored personal meta-wallet data associated with the registered meta-wallet user and thus does not satisfy the authentication protocol; and
transmit a user authentication denied message to at least one of the user device and the entity computer.

7. The system of claim 1, wherein the instructions for receiving the user authentication request further comprises instructions configured to cause the meta-wallet processor to receive location data from the user mobile device indicating a current location of the user mobile device.

8. The system of claim 7, further comprising instructions configured to cause the meta-wallet processor to:
determine, based on the location data, that the user mobile device is located in an area having an increased rate of fraudulent activity; and
modify at least one meta-wallet authentication data requirement.

9. The system of claim 8, further comprising instructions configured to cause the meta-wallet processor to transmit, via the communications device, a prompt to the user mobile device for the meta-wallet user to provide further user identification data to satisfy the at least one modified meta-wallet authentication data requirement.

10. The system of claim 1, further comprising, prior to the instructions for receiving the user authentication request, instructions configured to cause the meta-wallet processor to:
receive a meta-wallet service enrollment request from a user device;
determine that the user device includes at least one of a biometric sensor and a camera;
prompt the user to provide at least one of biometric data and visual data;
receive at least one of user biometric data and user visual data from the user device; and
store the at least one of user biometric data and user visual data in a storage device.

11. The system of claim 10, further comprising instructions configured to cause the meta-wallet processor to:
   determine a meta-wallet user security protocol with regard to at least one type of activity that comprises at least one of the biometric data and the visual data; and
   store the meta-wallet user security protocol in the storage device.

12. The system of claim 1, further comprising, prior to the instructions for receiving the user authentication request, instructions configured to cause the meta-wallet processor to:
   receive a meta-wallet service enrollment request from a user device;
   prompt the user to provide at least one of biometric data, personal assets data, and social media data;
   receive at least one of the biometric data, the personal assets data, and the social media data of the meta-wallet user from the user device; and
   store the at least one of the biometric data, the personal assets data, and the social media data of the meta-wallet user in a storage device.

13. The system of claim 12, further comprising instructions configured to cause the meta-wallet processor to:
   determine a meta-wallet user security protocol with regard to at least one type of activity that comprises at least one of the biometric data, the personal assets data, and the social media data of the meta-wallet user; and
   store the meta-wallet user security protocol in the storage device.

14. A method for providing user authentication services at an appropriate security level comprising:
   receiving, by a meta-wallet processor of a meta-wallet computer via a communication device, a user authentication request from a user mobile device, the user authentication request comprising a combination of a meta-wallet identifier, an entity identifier associated with an entity device, a context identifier determined by a meta-wallet application resident on the user mobile device based on activity data, and at least one of user biometric data, user personal assets data personally identifiable to the user, and user social media data personally identifiable to the user;
   determining, by a meta-wallet processor based on the meta-wallet identifier and the context identifier, that the user is a registered meta-wallet user, that the user defined a plurality of security protocols, and that the user is engaging in a predetermined type of activity defined by the context identifier;
   selecting, by the meta-wallet processor, a security protocol from the plurality of security protocols defined by the user based on the type of activity defined by the context identifier;
   determining, by the meta-wallet processor, that a combination of personally identifiable assets data and at least one of user biometric data and user social media data matches stored personal meta-wallet data associated with the registered meta-wallet user and thus satisfies the selected security protocol; and
   transmitting, by the meta-wallet processor via the communication device to at least one of the user mobile device and the entity computer associated with the entity identifier, a user authentication confirmation message.

15. The method of claim 14, further comprising, subsequent to selecting the security protocol:
   determining, by the meta-wallet processor, that the at least one of user biometric data, user personal assets data, and user social media data does not match stored personal meta-wallet data associated with the registered meta-wallet user and thus does not satisfy the authentication protocol; and
   transmitting, by the meta-wallet processor to at least one of the user device and the entity computer, a user authentication denied message.

16. The method of claim 14, wherein receiving authentication data further comprises receiving, by the meta-wallet processor from the user mobile device, location data indicating a current location of the user mobile device.

17. The method of claim 16, further comprising:
   determining, by the meta-wallet processor based on the location data, that the user mobile device is located in an area having an increased rate of fraudulent activity; and
   modifying, by the meta-wallet processor, at least one meta-wallet authentication data requirement.

18. The method of claim 17, further comprising, transmitting, by the meta-wallet processor, a prompt to the user mobile device for the meta-wallet user to provide further user identification data to satisfy the at least one modified meta-wallet authentication data requirement.

19. The method of claim 14, further comprising, prior to receiving the user authentication request:
   receiving, by the meta-wallet processor from a user device, a meta-wallet service enrollment request;
   determining, by the meta-wallet processor, that the user device includes at least one of a biometric sensor and a camera;
   prompting, by the meta-wallet processor, the user to provide at least one of biometric data and visual data;
   receiving, by the meta-wallet processor from the user device, at least one of user biometric data and user visual data; and
   storing the at least one of user biometric data and user visual data in a storage device.

20. The method of claim 19, further comprising:
   determining, by the meta-wallet processor, a meta-wallet user security protocol with regard to at least one type of activity that comprises at least one of the biometric data and the visual data; and
   storing, by the meta-wallet processor, the meta-wallet user security protocol in the storage device.

21. The method of claim 14, further comprising, prior to receiving the user authentication request:
   receiving, by a meta-wallet processor from a user device, a meta-wallet service enrollment request;
   prompting, by the meta-wallet processor, the user to provide at least one of biometric data, personal assets data, and social media data;
   receiving, by a meta-wallet processor from the user device, at least one of the biometric data, the personal assets data, and the social media data of the meta-wallet user; and
   storing, by the meta-wallet processor in a storage device, the at least one of the biometric data, the personal assets data, and the social media data of the meta-wallet user.

22. The method of claim 21, further comprising:
   determining, by the meta-wallet processor, a meta-wallet user security protocol with regard to at least one type of activity that comprises at least one of the biometric data, the personal assets data, and the social media data of the meta-wallet user; and
   storing, by the meta-wallet processor, the meta-wallet user security protocol in the storage device.

23. An apparatus for providing user authentication services at an appropriate level of security comprising:
A meta-wallet processor;
a non-transitory computer medium operably coupled to the meta-wallet processor, the non-transitory computer medium storing instructions configured to cause the processor to:
receive, via the communication device from a user mobile device, a user authentication request comprising a combination of a meta-wallet identifier, an entity identifier associated with an entity device, a context identifier determined by a meta-wallet application resident on the user mobile device based on activity data, and at least one of user biometric data, user personal assets data personally identifiable to the user, and user social media data personally identifiable to the user;
determine, based on the meta-wallet identifier and the context identifier, that the user is a registered meta-wallet user, that the user defined a plurality of security protocols, and that the user is engaging in a predetermined type of activity defined by the context identifier;
select a security protocol from the plurality of security protocols defined by the user based on the type of activity defined by the context identifier;
determine that a combination of personally identifiable assets data and at least one of user biometric data and user social media data matches stored personal meta-wallet data associated with the registered meta-wallet user and thus satisfies the selected security protocol; and
transmit, via the communication device to at least one of the user mobile device and the entity computer associated with the entity identifier, a user authentication confirmation message.

* * * * *